United States Patent [19]
Russ, deceased et al.

[11] Patent Number: 5,285,638
[45] Date of Patent: Feb. 15, 1994

[54] METHOD AND APPARATUS FOR MAXIMIZING FUEL EFFICIENCY FOR JET ENGINES

[75] Inventors: Daniel G. Russ, deceased, late of Fort Wayne, by Ruth S. Russ, executrix; George J. Bertsche, Woodburn, both of Ind.

[73] Assignee: Telectro-MEK, Inc., Fort Wayne, Ind.

[21] Appl. No.: 812,415

[22] Filed: Dec. 23, 1991

Related U.S. Application Data

[63] Continuation-in-part of Ser. No. 706,338, May 28, 1991, abandoned.

[51] Int. Cl.$^5$ ................................. F02K 3/00
[52] U.S. Cl. ........................ 60/243; 60/39.15
[58] Field of Search ............... 60/228, 235, 243, 39.15

[56] References Cited

U.S. PATENT DOCUMENTS

| | | | |
|---|---|---|---|
| 3,839,860 | 10/1974 | Martin | 60/243 |
| 4,038,526 | 7/1977 | Eccles et al. | 60/39.15 |
| 4,136,517 | 1/1979 | Brown | 60/243 |
| 4,437,303 | 3/1984 | Cantwell | 60/243 |
| 4,546,353 | 10/1985 | Stockton | 60/39.15 |

Primary Examiner—Richard A. Bertsch
Assistant Examiner—Michael I. Kocharov
Attorney, Agent, or Firm—Levisohn, Lerner & Berger

[57] ABSTRACT

A system and method to maximize fuel efficiency for a plurality of simultaneously operating engines is disclosed. The system includes means to determine the fuel consumption of the engine, measure the thrust of each engine and means to substantially equalize the ratio of the fuel consumption to the thrust between each of the engines. A pressure transducer is included to provide thrust data supply to each of the engines to a microprocessor, and a microprocessor is run to substantially equalize the ratio of the fuel consumption to the thrust to provide an increased fuel efficient system.

11 Claims, 4 Drawing Sheets

METHOD AND APPARATUS FOR MAXIMIZING FUEL EFFICIENCY FOR JET ENGINES

This application is a continuation-in-part of Ser. No. 07/706,338 filed May 28, 1991 now abandoned.

BACKGROUND OF THE INVENTION

This invention relates to increasing fuel efficiency of multi-engine machinery, and more particularly to multi-engine aircraft.

The need to maximize the efficiency of fuel consumption in jet aircraft is well known. Fuel costs continue to rise, and an important element of operating such aircraft is to maximize fuel efficiency.

The prior art is replete with differing techniques and approaches to achieve this objective. U.S. Pat. No. 4,312,041 entitled Flight Performance Data Computer System employs a system to determine different flight profile data to provide the most fuel efficient flight. U.S. Pat. No. 4,325,123 entitled Economy Performance Data Avionic System employs a system in which fuel efficiency is sought to be achieved by determining the most economical engine thrust settings and air speeds for different phases of the flight as well as considering the drag and thrust peculiarities of the aircraft, zero fuel weight errors and other factors.

One of the inherent problems of engine fuel efficiency, especially jet engines, is that as they are manufactured and assembled, each has different operating characteristics. No two jet engines are alike, and this becomes further emphasized due to wear characteristics of such jet engines as they age. Thus, in considering how to maximize fuel efficiency, the ultimate objective of maximizing total thrust in relationship to the fuel efficiency is an important factor to be determined.

An object of this invention is to provide a system which minimizes fuel consumption for aircraft powered by two or more jet engines.

Another object of this invention is to provide such a system which is easy to operate, yet reliable.

Other objects, advantages and features of this invention will become more apparent from the following description.

SUMMARY OF THE INVENTION

The proposed system does not use accelerometers, direction control servomechanisms, nor airspeed control damping, over-damping, error, and hysteresis. The present system has been developed as a result of certain research work as identified below which demonstrates the validity of the present system for maximizing fuel efficiency for jet engine aircraft.

The following graphical analysis shows that minimum total fuel consumption for a given air speed is provided by unbalancing the individual thrusts so as to make the "differential specific fuel consumptions equal" (DSFC).

Specific fuel consumption is the ratio of fuel consumption to thrust, i.e. SFC $=w/t$, where w is consumption in lb/hr, t is lb thrust, and SFC is lb/hr/lb. DSFC is defined as: DSFC$=\delta w/\delta t$, and it, too, is lb/hr/lb.

FIG. 1 shows a representative plot of fuel consumption vs thrust for a jet engine. Consumption (w) increases as thrust increases.

For this plot:

$w1(t):=0.5+2t-0.04t^2+0.0004t^3$ (lbs/hr fuel consumption)

$t:=1\ldots 100$ (Lbs thrust iterated from 1 to 100)

Now suppose we have another engine with a different $w=f(t)$ function, namely:

$w2(t):=0.5+2t-0.03t^2+0.0004t^3$ (lbs/hr)

FIG. 2 shows the fuel consumption plots for both engines. Engine 2 is plotted with plus signs (+).

Now suppose that we need a total thrust of 100 units which may be 50 from each, 60 from one and 40 from the other, and so forth.

If we reverse the plot of one engine so that it is plotted from 100 to 1 rather than from 1 to 100, we will have the desired ratio at all points. Let us define w3(t) as w2(t) reversed and w4(t) as the total fuel consumption (dots):

$w3(t):=w2(100-t),\ w4(t):=w1(t)+w3(t)$

The minimum point in the top curve shows the best thrust proportioning choice for minimum fuel consumption. It is 60 lbs for engine one and 40 lbs for engine two (engine two is plotted reversed).

The derivative (slope) of the sum curve (w4) is zero at the minimum. Since the derivative of (A +B) =derivative of A +derivative of B, the slopes of w1 and w3 are exactly equal but opposite at the optimum point. BUT w3 is reversed from w2, therefore the derivatives of w1 and w2 ARE EXACTLY EQUAL at the optimum point. THIS IS THE PRINCIPLE OF THE ECONOTHRUST INSTRUMENT.

FIG. 4 shows the derivatives of w1 and w2 and their sum (the dots) with the w2 derivative (+signs) plotted from 100 to 1.

$$D1(t) := \frac{d}{dt} w1(t) \quad D2(x) := \frac{d}{dx} w2(x)$$

$$D3(t) := D1(t) - D2(100 - t)$$

Note that minimum fuel consumption is achieved with #1 thrust adjusted till DSFC1=DSFC2, which is the point where the difference curve (DSFC1−DSFC2)=0.

This same strategy works with three or four or more engines. That is, with multiple engines having the sum of the fuel consumptions versus thrusts defined as:

$W:=w1(t1)+w2(t2)+w3(t3)+w4(t4)$

Minimum W for a given total thrust (given air speed) is achieved by making the derivatives of the fuel consumptions with respect to thrust equal:

$$\frac{d}{t1} W1(t1) = \frac{d}{t2} W2(t2) = \frac{d}{t3} W3(t3) = \frac{d}{t4} W4(t4)$$

This is the same as making the DIFFERENTIAL SPECIFIC FUEL CONSUMPTIONS equal, i.e.:

$DSFC1=DSFC2=DSFCC3=DSFC4$

The above presentation will be expanded in the following description which presents a preferred system for providing maximum fuel efficiency by sensing and rendering substantially equal the differential specific fuel consumptions (DSFC) of each of the engines.

DETAILED DESCRIPTION

Figure 1:
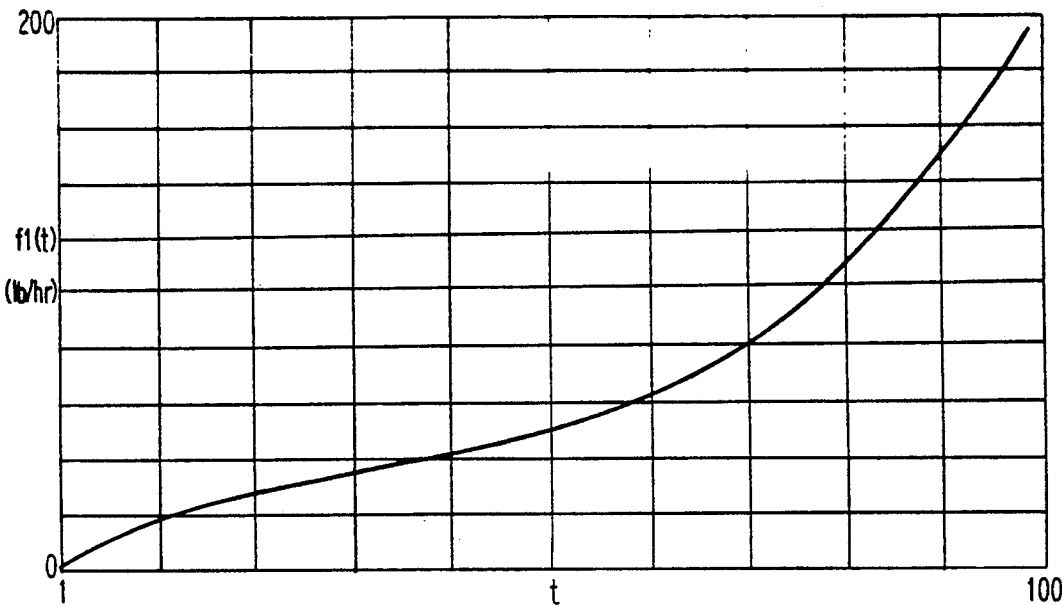
FIG. 1 is a representative plot of fuel consumption versus thrust for a jet engine.
Figure 2:
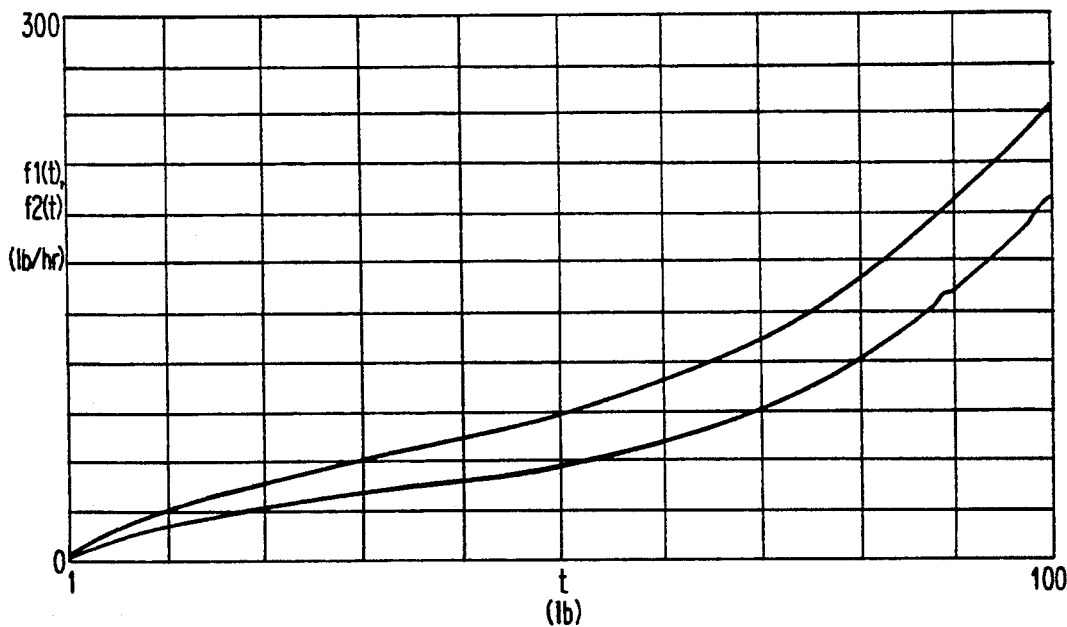
FIG. 2 is an illustrative fuel consumption versus thrust for two different engines.
Figure 3:
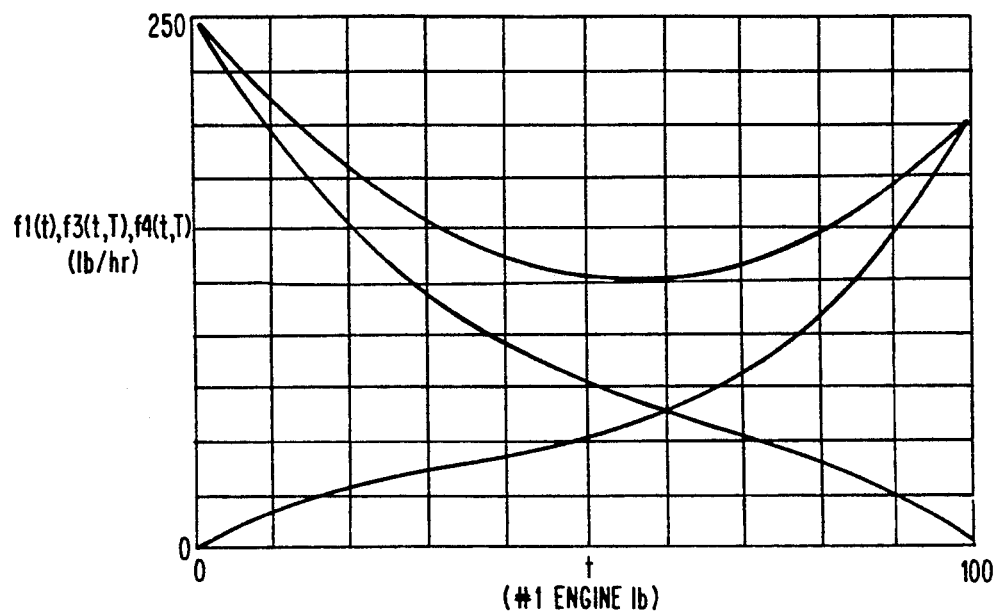
FIG. 3 is a curve of the fuel consumption of two engines with one of the curves reversed and the sum of the curves.
Figure 4:
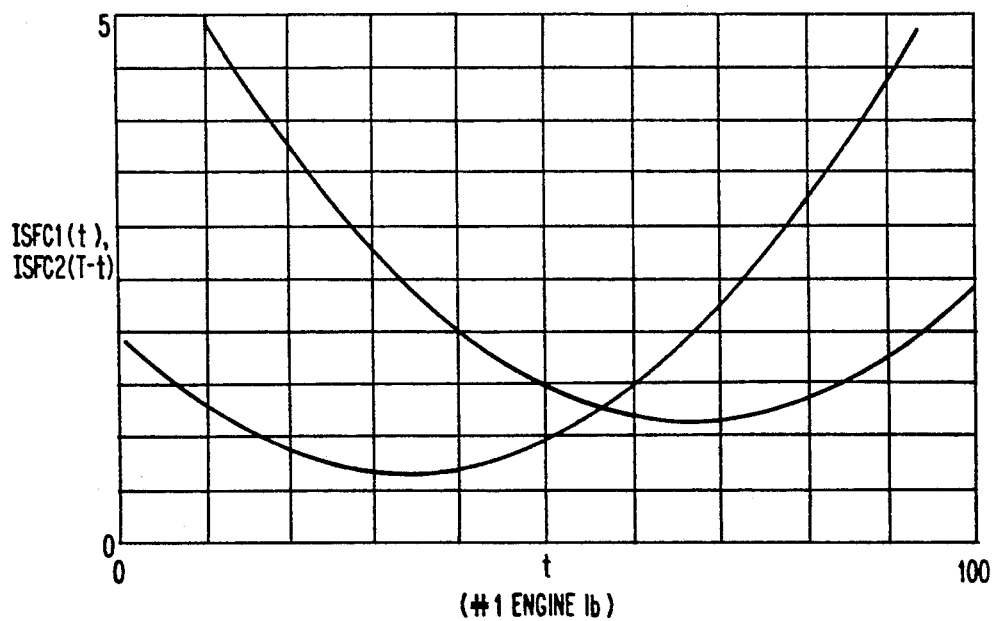
FIG. 4 is a curve showing the differential specific fuel consumption (DSFC) of the curves of FIG. 3 and the difference of the DSFC's.
Figure 5:
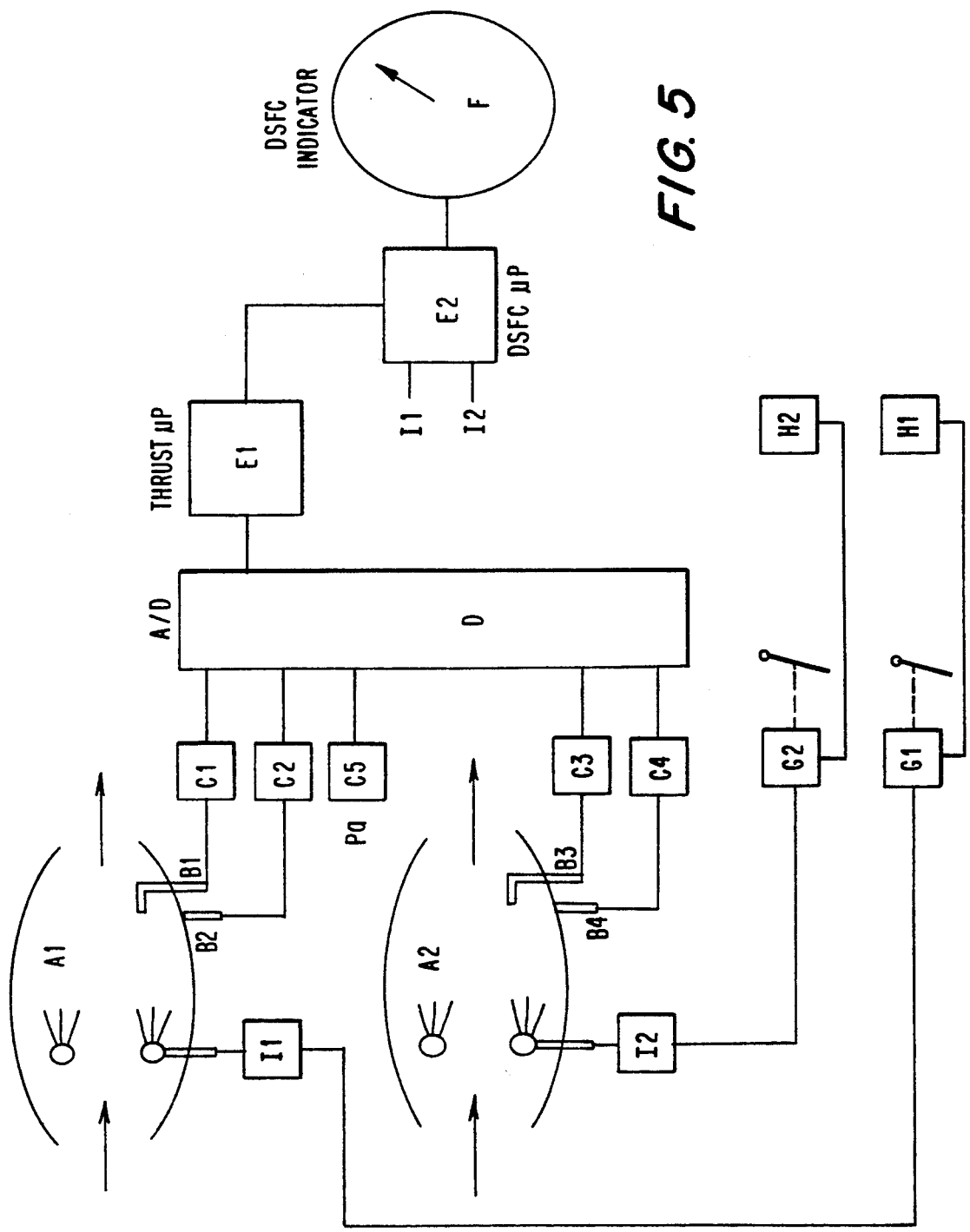
FIG. 5 is a block diagram of a system to implement this invention.

FIG. 5 is an illustrative block diagram of an embodiment of this invention. This embodiment illustrates the principles of this invention which provides means to substantially equalize the differential specific fuel consumption (DSFC) of each of the engines of an airplane at any given airspeed in order to maximize fuel efficiency. Such substantial equalization can be performed automatically or by direct actuation upon noting the DSFC of each of the engines. Further, if there is a material difference or change in the DSFC of any engine, it is an indication of potential maintenance or other problems with the engine which should be readily investigated to prevent possibly otherwise undetected engine problems.

FIG. 5 shows the system diagram. A1 and A2 illustrate two engines. B1–B4 are four pressure probes attached to the engines. B1 and B3 can be existing EPR (engine pressure ratio) probes. B2 and B4 are added "wall static" probes. C1–C5 are pressure transducers. The C5 pressure is tapped from the existing airframe pitot static probe. D is a multiplexing analog to digital (A/D) converter. E is a microprocessor shown as parts E1 and E2 operated by software. F is a DSFC indicator. G1 and G2 are present throttle control systems which typically regulate on turbine spool speed N1 or N2. H1 and H2 are fuel flow modulators. I1 and I2 are present fuel flow indicators.

If the engines A1 and A2 are turbo-fan, more probes (B) may be needed. If the transducers C are pressure to digital, then A/D converter D will not be needed.

Microprocessor E1 computes the gross thrust from the measured three pressures in accordance with:

$$Fg = Ae \, Pa \, f(Pt6/Pa) \, f2(Pt6/Ps6) \quad (2)$$

which is used to find:

$$F = \frac{Vg \cdot w}{g} \quad (3)$$

Where:
g = ft/sec squared
Vg = velocity of gases (ft/sec)
w = weight flow (lb/sec)

H1 and H2 modulate the fuel flow via the throttle control system in any convenient way depending on the throttle system being used.

Microprocessor E2 senses the variation in fuel flow I and thrust (output of E1) to compute DSFC. The indicator F shows the DSFC error and optionally can show the total gross thrust.

Probes B1 and B2 are connected to airplane engine A1 while probes B3 and B4 are connected to airplane engine A2. Pressure transducer C1 is connected to the output of pressure probe B1 while pressure transducer C2 is connected to the output of probe B2. The outputs of pressure transducers C1 and C2 are connected as inputs to A/D converter D. Pressure transducer C5 is connected to the existing airframe pitot static probe, and its output connected as another input to A/D converter D.

Similarly, probes B3 and B4 are connected to airplane engine A2, and their outputs are connected through pressure transducers C3 and C4 as inputs to A/D converter D. The output of A/D converter D is connected to the microprocessor and is used to determine data relating to the thrust of the engines A1 and A2. The output of microprocessor E1 is connected as an input to microprocessor E2, with the other inputs of microprocessor E2 being provided with information concerning present fuel flow characteristics regarding the jet engines A1 and A2 respectively.

Microprocessor E2 determines the differential specific fuel consumption in accordance with the teachings of this invention.

I1 controls fuel flow to engine A1, while I2 controls fuel flow to engine A2. I1 and I2 are, in turn, controlled by throttle control systems G1 and G2, respectively, which are themselves controlled, in part, by fuel modulators H1 and H2, respectively.

As stated above, an object of this invention is to provide a system in which the differential specific fuel consumption of each engine of a multiengine jet plane is maintained substantially equal. This is expressed by the general formula:

$$\frac{dW_1}{dF_1} = \frac{dW_2}{dF_2} = \cdots \frac{dW_m}{dF_m} \quad (1)$$

where
W denotes the fuel consumption input and
F denotes the net thrust output, and
subscript 1,2 ... m, denotes engine "1", engine "2", ... and engine "m", respectively.

The following illustrates one method of determining the differential specific fuel consumption characteristics controlled by the microprocessors.

A basic determination are the values of SFC and DSFC of the of jet engines for purposes of effecting conservation of energy to promote economies in the maintenance and operation of jet engines. Further, when SFC characteristics are known as functions of either fuel flow or net thrust, DSFC characteristics may also be determined via such SFC characteristics pursuant to the following relations:

In general, $$SFC = \frac{W}{F} \quad (2)$$

Therefore, $$W = (SFC)F \quad (3)$$

and

-continued $$dW = Fd(SFC) + (SFC)dF \quad (4)$$

by taking differentials.

Dividing equation (3) into equation (4) yields also the symmetric relationship $$\frac{dW}{W} = \frac{d(SFC)}{(SFC)} + \frac{dF}{F} \quad (5)$$

Using equation (3) and rearranging equation (4) (or(5)) in terms of SFC characteristics with respect to fuel and net thrust, respectively to solve for DSFC yields the relations $$DSFC = dW = \left( \frac{(SFC)^2}{dF_{dW}[W(d(SFC) - (SFC)]} \right) \quad (6)$$

$$= F \frac{d(SFC)}{dF} + SFC \quad (7)$$

When SFC characteristics are well-defined relations of either fuel flow or net thrust, equations (6) and (7) offer other means of computing DSFC using the derivatives d(SFC)/dW or d(SFC)/dF alternatively. For any given engine, these latter derivatives may remain more constant than the direct derivative DSFC, although subject to SFC changes with engine use, some advantages in computing DSFC by equations (6) and (7) may exist.

A system, such as depicted schematically in FIG. 5, whose function it is to measure, relate, and use energy input (fuel flow) and output (net thrust) variables for purposes of effecting performance maintenance and operational economies in the case of jet engines may be applicable to groups of energy transformation equipment and machines other than jet engines; to such extent, the techniques of this invention are not to be limited to jet engines. Furthermore, it will be evident to those familiar with electronic, pneumatic, and mechanical analog that, although the discussion herein is limited to electronic technology and this technology is preeminent for computer purposes, that the invention is not necessarily limited to such techniques, particularly where the use of other techniques may be necessary as in pressure and temperature transducer inputs, for example.

The state-of-the-art in thrust measurement has been such that many other variables are regarded as output variables of jet engines. Such variables, particularly engine pressure ratio and/or tail pipe total pressure, for thrust may be used dependent on the operating conditions or nature of the engines involved.

The system of FIG. 5 can be operational at any time or all the time since it does not affect flight characteristics. The equalization of the DSFC may be automatic or may be controlled by the pilot. The pilot can use the system during climb, cruise or descent since attitude changes do not affect the accuracy of the system. If the pilot chooses to enhance fuel efficiency, he may observe an imbalance in the DSFC as provided by DSFC indicators illustratively shown in FIG. 8 and, the pilot may gently rock the throttles one up and one down to eliminate the unbalance. If more than two engines are used, more throttles would be utilized to substantial equalize the DSFC between each of the engines.

If the jet engines are widely spaced, and if their efficiencies differ considerably, considerable thrust imbalance may be required which would cause yaw. A rudder trim can be utilized to maximize airspeed and deal with such yaw.

Figure 6:
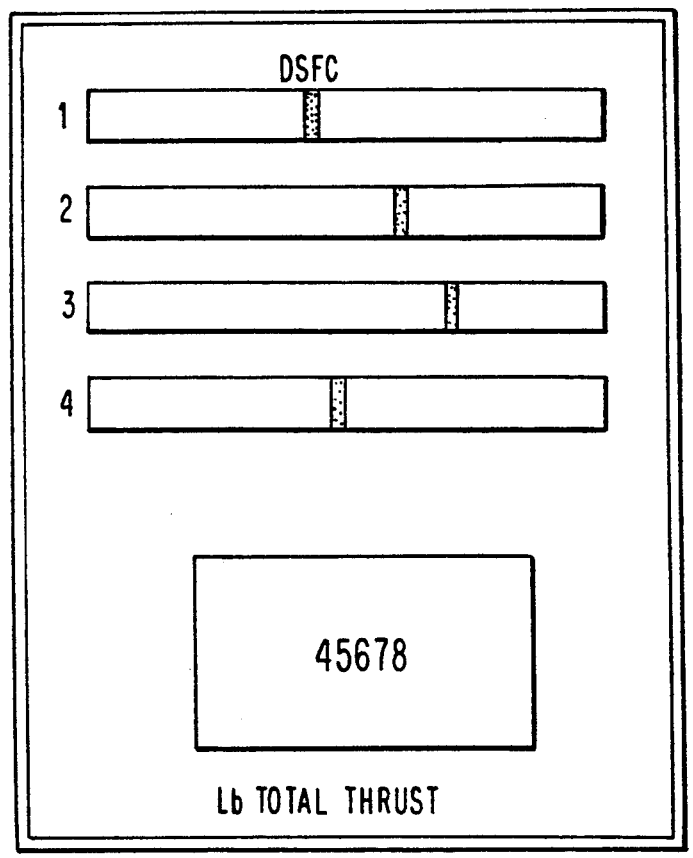
FIG. 6 is an illustrative multiengine display showing four differential specific fuel consumption meters operating in accordance with this invention.

The multiengine display of FIG. 6 illustrates four DSFC indicators with a total gross thrust reading. The pilot can automatically or manually align the four indicators while maintaining the desired total gross thrust. If the system determines that an unusual amount of thrust imbalance is needed to achieve the DSFC equalization, it would indicate that one of the engines is in need of maintenance attention.

While the above invention has been described with one illustrative embodiment, there are other optional variations which could be included as follows:

1) Two engine DSFC indicators using gross thrust.
2) Two engine DSFC indicators using net thrust.
3) Three or four engine DSFC indicators using gross thrust.
4) Three or four engine DSFC indicators using net thrust.
5) Two engine automatically optimizing system using gross thrust. This system would automatically disengage during takeoff and landing (where balanced thrust is more important than balanced DSFC). It could be turned off at any time if desired. A light would display when in automatic mode.
6) Two engine automatically optimizing system using net thrust.
7) Three or four engine automatically optimizing system using gross thrust.
8) Three or four engine automatically optimizing system using net thrust.

Of these options, the net thrust systems are the most accurate. "Net thrust" in this context simply means gross thrust minus ram drag. Nacelle drag is the same for all engines and cancels out of the thrust difference.

However, since ram drag is mostly airspeed dependent and does not vary with throttle to the extent gross thrust does, and since unsick engines themselves do not vary vastly from one another, a gross thrust system will be just as good for fuel economy.

As a general rule, a direct measure of net thrust (as would be provided in a system described in a patent by one of the co-inventors herein, U.S. Pat. No. 3,233,451, for example) is preferable, since such a system measures net thrust independent of the engine's performance otherwise and also is impervious to geometric and installation characteristics as well as of logged time, use, and even abuse, of the engine. In other words, such a system measures net thrust in an "instrument" sense in that net thrust intelligence is based on actual, rather than presumed and synthesized output.

This invention has been described with a preferred embodiment, but other applications of the principles of this invention and utilizations thereof will be made by those of ordinary skill in the art. The scope of protection for this invention and the invention is identified in the attached claims.

We claim:

1. A system for maximizing fuel efficiency for a plurality of simultaneously operating engines causing movement to be imparted to an object, said system comprising means to determine the fuel consumption of each engine, means to measure the thrust of each engine, and means to substantially equalize the ratio of the derivatives of fuel consumption to the thrust as between each of said engines.

2. A system as set forth in claim 1, wherein said engines are jet engines.

3. A system as set forth in claim 2, wherein said object is a jet plane with at least two engines.

4. A system as set forth in claim 1, wherein said system comprises a microprocessor, a plurality of pressure transducers attached to each of said engines, said pressure transducers providing thrust data supplied from each of said engines to said microprocessor, and means to provide fuel flow data to said microprocessor.

5. A system as set forth in claim 4, wherein said plurality of pressure transducers are connected to an analog to digital converter.

6. A system as set forth in claim 1, further comprising a differential specific fuel consumption (DSFC) indicator for each of said engines and means to equalize the DSFC of said indicators.

7. A system as set forth in claim 1, wherein said system comprises electronic circuit means, a plurality of pressure transducers attached to each of said engines, said pressure transducers providing thrust data supplied from each of said engines to said electronic circuit means, and means to provide fuel flow data to said electronic circuit means.

8. A system as set forth in claim 7, further comprising a differential specific fuel consumption (DSFC) indicator for each of said engines and means to equalize the DSFA of said indicators.

9. A system as set forth in claim 1, wherein said system comprises a plurality of pressure transducers attached to each of said engines, said pressure transducers providing thrust data provided to said system.

10. A system as set forth in claim 9, wherein said plurality of pressure transducers are connected to an analog to digital converter.

11. A system as set forth in claim 9, further comprising a differential specific fuel consumption (DSFC) indicator for each of said engines and means to equalize the DSFC of said indicators.

* * * * *